Oct. 1, 1963   A. L. FERNELIUS   3,105,430
CAMERA MOUNT
Filed April 29, 1960   2 Sheets-Sheet 1
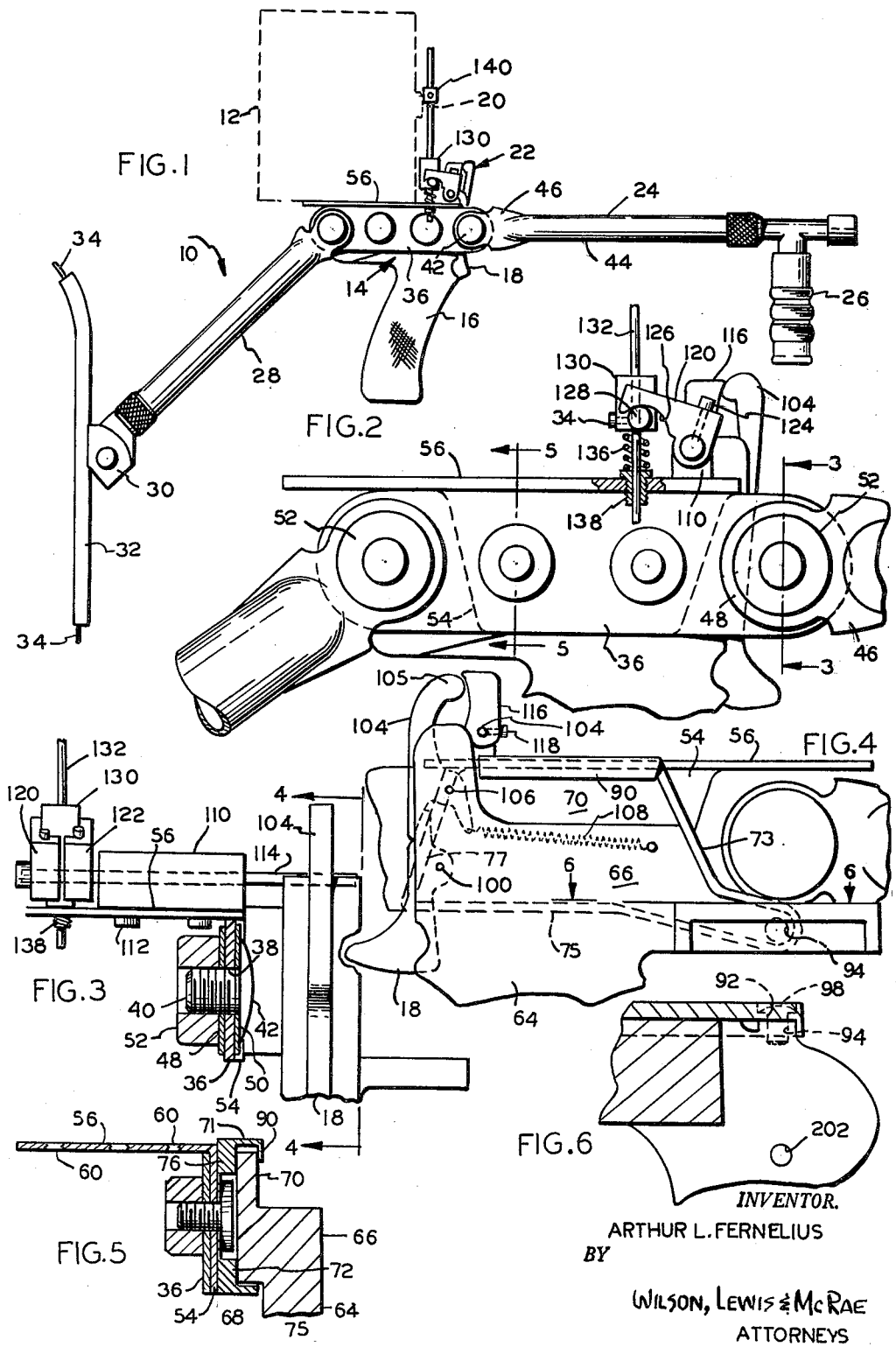
INVENTOR.
ARTHUR L. FERNELIUS
BY
WILSON, LEWIS & McRAE
ATTORNEYS Oct. 1, 1963  A. L. FERNELIUS  3,105,430
CAMERA MOUNT
Filed April 29, 1960  2 Sheets-Sheet 2
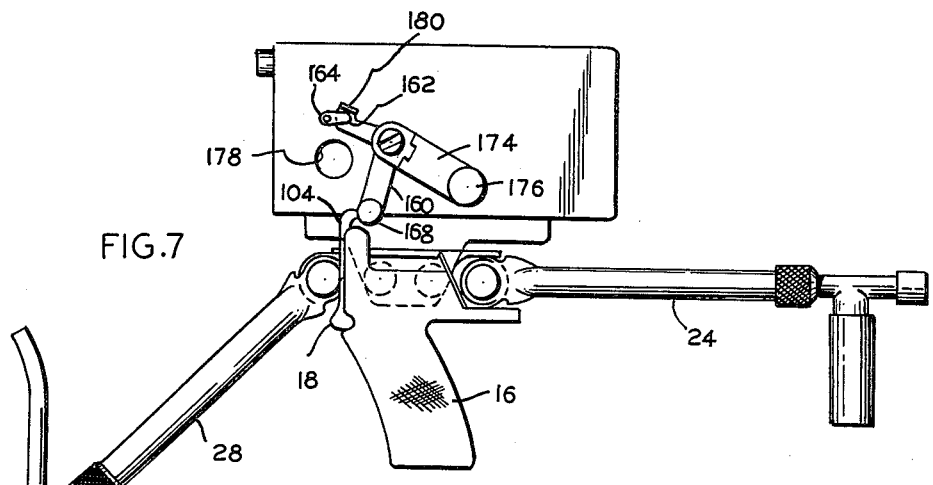
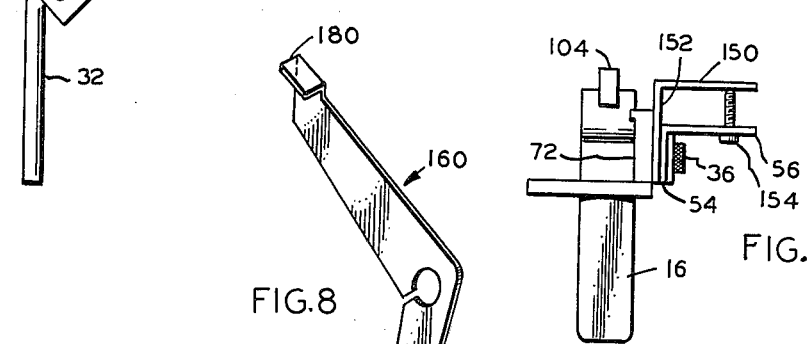
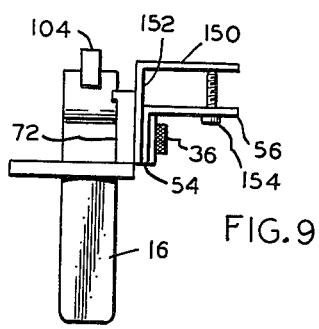
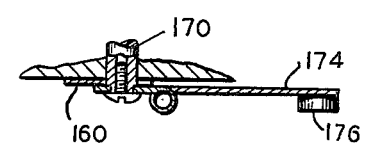
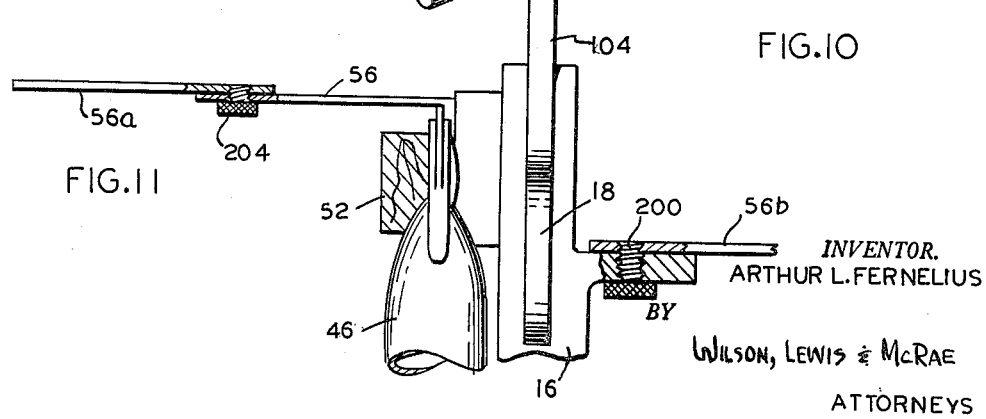
INVENTOR.
ARTHUR L. FERNELIUS
BY
WILSON, LEWIS & McRAE
ATTORNEYS United States Patent Office 3,105,430
Patented Oct. 1, 1963

3,105,430
CAMERA MOUNT
Arthur L. Fernelius, 14633 Richmond, Southgate, Mich.
Filed Apr. 29, 1960, Ser. No. 25,645
1 Claim. (Cl. 95—86)

This invention relates to an instrument mount, as for example a mount adapted to support such instruments as movie cameras, still cameras, telescopes, and other similar sight instruments.

During the past few years many different movie cameras and still cameras have been introduced onto the market. Generally these cameras are by themselves not readily adapted to be correctly positioned with respect to the objects being photographed. Thus, in the taking of moving pictures it is of advantage for the photographer to have complete control over the camera and to be able to hold or swing the camera in the desired pattern or path in accordance with the direction or speed of motion of the objects being photographed. Conventional cameras are generally designed as hand-manipulatable box structures, and it is difficult or impossible for the photographer to accurately control and move such cameras with hand manipulations. It is much preferred to provide an arrangement wherein a support or mount in the nature of a gun or rifle is utilized to mount the camera, since with such an arrangement the photographer can position the butt portion of the gun stock against his shoulder and control the swinging motion of the camera by means of a hand grip or similar construction located at the forward portion of the mount.

In my previously filed patent application, Serial No. 731,335, filed April 28, 1958, now Patent No. 3,002,663, I have illustrated and described a mount structure which is of particular advantage in the mounting of movie cameras and the like. However, I have found that in many cases special provisions must be utilized to incorporate the mount to some of the most widely used cameras and to accommodate the wishes and desires of many of the camera users and photographers.

In this connection it should be noted that many camera users prefer to operate their cameras by means of a pistol-grip shutter structure, as for example the type known as the "Bolex pistol grip." This pistol grip incorporates a pistol hand grip, together with a trigger-actuated shutter lever, and a camera platform. The arrangement provides for convenient actuation of the camera shutter, but it fails to offer the advantages of steadiness such as are provided by a gunstock-type mount as disclosed in the above-mentioned patent application.

It is an object of the present invention to provide a construction and arrangement wherein the trigger action advantages of the pistol-type mount are combined with the steadiness advantages of the gunstock-type mount. Preferably the piston grip and gunstock mounts are detachably connected together to permit of their separate use when desired.

In the conception of the present invention it was realized that camera users are reluctant to modify their existing mounts as by drilling holes, or performing other machining operations thereon. Accordingly under the present invention a unique adapter construction is provided to releasably accommodate the piston structure to a gunstock mount without necessitating the performance of any machining operations by the user.

The conventional pistol grip mount suffers in its range of usefulness by reason of the fact that it is adapted for use with only a small number of cameras. It was therefore reasoned that improved benefits to users of cameras could be attained by constructing devices of the present invention so as to accommodate the pistol-type mounts to a larger number of camera styles and sizes than was previously possible. In this connection it is here noted that conventional cameras differ from one another primarily in the placement of the shutter actuator or button. For example, in some cameras the shutter button is located on the front face of the camera, and in other cameras the shutter button is located on the side or top surfaces of the camera. Additionally, the shutter buttons for the various cameras may be designed to operate with an in-and-out motion, a side-to-side motion or an up-and-down motion. Such differences in construction and general arrangement make difficult the problem of designing a universally usable mount structure having the plural advantages of the pistol and gunstock type constructions as envisioned herein. However, under the invention special provisions are incorporated to accommodate the improved pistol-gunstock mount to cameras with widely varying shutter button locations. In some instances the shutter button location is accommodated by adjustable connections in the shutter actuator linkage, and in other instances the shutter button location is accommodated by parts replacement.

An object of the present invention is to provide a substantially universal instrument mount incorporating advantageous features of both the pistol arrangement and the gunstock arrangement.

Another object of the invention is to provide a device of the above-mentioned character wherein cameras having widely different shutter button characteristics can be operatively incorporated and utilized.

A further object of the invention is to provide an arrangement for operatively incorporating a pistol grip mount with a gunstock mount without necessitating the use of machining operations on any of the components.

A further object of the invention is to provide a gunstock-pistol grip arrangement wherein the pistol-trigger assembly can be quickly and easily removed from and installed on the gunstock so as to permit the user to employ either or both of the mounting devices at his discretion and in accordance with his individual desires.

A further object of the invention is to provide a combination gunstock-pistol grip mount structure wherein certain of the components are removably and detachably connected together so as to permit the manufacturer to build and stock a range of mounting structures accommodating different cameras without the necessity for building a large number of entirely different or separate assemblies, the advantage in this arrangement residing in the elimination of inventory and the more economical production of a complete range of mount structures.

A general object of the invention is to provide a mount arrangement for an instrument which may be constructed at a reasonably low cost and which has a long service life without repair or parts replacement.

Other objects of this invention will appear in the following description and appended claim, reference being had to the accompanying drawings forming a part of this specification wherein like reference characters designate corresponding parts in the several views.

In the drawings:

FIGURE 1 is a side elevational view of one embodiment of the invention;

FIG. 2 is an enlarged view of a portion of the structure shown in FIG. 1;

FIG. 3 is a sectional view taken on line 3—3 in FIG. 2;

FIG. 4 is a view taken along line 4—4 in FIG. 3;

FIG. 5 is a sectional view taken on line 5—5 in FIG. 2;

FIG. 6 is a sectional view taken on line 6—6 in FIG. 4;

FIG. 7 is a side elevational view of a second embodiment of the invention;

FIG. 8 is a perspective view of a lever element employed in the FIG. 7 embodiment;

FIG. 9 is a front elevational view of the FIG. 7 embodiment with parts removed for illustration purposes; and FIG. 10 is a sectional view taken through a film rewind spindle in the structure of FIG. 7.

FIG. 11 is a view illustrating the FIG. 1 structure in use with auxiliary camera mount structures, the purpose being to permit the mounting of a plurality of cameras on the same pistol-grip assembly.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings and particularly FIG. 1, there is disclosed a camera mounting structure generally designated by the numeral 10. The camera is shown in dotted lines and is designated by numeral 12.

The camera mount comprises a central camera supporting structure 14, a forward arm 24, and a rear arm 28. Supporting structure 14 includes a pistol grip mechanism 16 which is provided with a trigger 18 for operating the camera shutter button 20 via the linkage 22.

Forward arm 24 is provided with a downwardly extending hand grip 26, and rear arm 28 is provided with an adjustable connection at 30 with the shoulder-engaging brace element 32. The adjustable connection 30 may be constructed in the same manner as the corresponding connection shown in previously mentioned patent application Serial No. 731,335. The shoulder-engaging brace element 32 may if desired to provided with a leather strap 34 which may be trained around the shoulder of the user as explained in detail in the above-mentioned application.

In use of the FIG. 1 apparatus the photographer positions mechanism 10 with his shoulder against the brace element 32 and with his left arm extending forwardly so as to have his left hand gripping hand grip 26. He trains his right hand around the pistol grip 16 and pulls the trigger 18 to operate the camera for picture-taking purposes. With the illustrated arrangement the photographer may easily move mechanism 10 with a swinging motion, either up and down or side-to-side, while still having complete control over position of the camera at all times. In this manner the process of taking pictures is more enjoyable and the photographer secures better pictures.

Preferably mechanism 10 is adjustable as to its size and parts relationship so as to permit the mechanism to comfortably fit all camera users, irrespective of such factors as human arm length and individual desires. Therefore, the connection between the central support structure 14 and arm 28 is a pivotal connection. Similarly, the connection between central portion 14 and arm 24 is a pivotal connection. Preferably each of the arms 24 and 28 is an adjustable length device, and in this connection both of the arm structures may be constructed as telescoped tube assemblies in the manner of the corresponding assemblies in the device shown in the above-mentioned patent application Serial No. 731,335.

Referring to FIGS. 2 through 5, central structure 14 comprises a vertical plate 36 having four circular openings therethrough at spaced points from its front edge to its rear edge. The front opening 38 (FIG. 3) in plate 36 accommodates the shank portion 40 of a locking screw 42. The aforementioned arm 24 is constructed to include a tubular member 44, and the portion thereof adjacent plate 36 is flattened so as to form a bifurcated structure 46. The two flat wall elements 48 and 50 formed by the bifurcation are arranged as shown in FIG. 3 so as to lie against opposite faces of the plate 36. Each of the two wall elements 48 and 50 is provided with a circular opening which receives the shank portion 40 of the screw as shown in FIG. 3, and a nut 52 is threaded onto shank portion 40 to cooperate with the head portion of the screw in exerting a clamping action on the two flat wall elements 48 and 50. The nut 52 may have a knurled peripheral surface, and/or the nut may have other configurations to permit its being tightly screwed onto the shank 40. It will be understood that the screw serves as a pivot for the arm 24 as well as a means for clamping the arm 24 in adjusted pivoted positions.

The above-described manner of pivotally connecting the arm 24 with plate 36 may also be employed in the pivotal connection of arm 28 with plate 36. Thus, as shown in FIG. 2, arm 28 may be constructed as a tubular element and may have its end portion flattened and bifurcated to provide two flat wall elements located along opposite faces of the plate 36. A second knurled nut 52 may be provided to lock the arm in its adjusted positions.

By reference to FIGS. 2 and 5, it will be seen that plate 36 has one of its faces engaged with the downwardly directed plate-like extension 54 of a camera-supporting platform 56. The platform is provided with a series of threaded apertures at 60 extending preferably in a series of rows equally spaced along the length and width of the platform. The number of these apertures may be varied, but in an illustrative embodiment there are provided twenty-one such apertures arranged in three rows, with seven apertures in each row. Preferably each aperture is tapped to provide threads for accommodation of a screw such as is conventionally employed to mount a camera in place. By this arrangement it will be seen that a camera such as camera 12 shown in FIG. 1 may be positioned on platform 56 and a screw threaded into one of the platform apertures to lock the camera to the platform. Because of the presence of a plurality of such apertures it is possible to vary the position of the camera laterally and longitudinally along the platform. In this manner the illustrated mount structure may better be accommodate to different sized cameras.

It has been previously explained that operation of the camera shutter is preferably effected by means of a trigger 18 located in the pistol grip 16. As best shown in FIG. 4, the pistol grip comprises a hand grip portion 64 which extends downwardly from a central portion 66. As seen in FIG. 5, the central portion 66 has a slightly greater cross section dimension than the hand grip portion 64 so that a shoulder is provided at 68. The portion of the pistol structure located above the shoulder 68 is extended vertically upward to provide what might be termed a wing or flange 70. It will be seen that by this arrangement the pistol structure can be operatively mounted within the flange 90 of the adapter structure generally designated by numeral 72.

The adapter structure comprises a vertically extending wall portion 76 having a peripheral wall structure extending right angularly to define the four flanges 71, 73, 75 and 77. Wing portion 70 is configured so that it fits within the space bordered by the four flanges, the arrangement being such that the angled-together flanges 73 and 77 (FIG. 4) snugly engage mating surfaces on the wing portion, leaving slight clearances at flanges 71 and 75. As seen in FIG. 6, the pistol grip is manufactured with a tapped hole 94. This hole is a conventional part of the pistol grip structure 16, and the adapter 72 has been expressly designed so that it can fit the pistol grip structure and effectively utilize the threaded opening 94 for securing purposes. Thus, after the pistol grip structure has been inserted into the adapter 72 (with the flange 70 nested under the lip 90 as shown in FIG. 5) a screw 98 is threaded through an opening 92 in the adapter and into the threaded opening 94 to lock the pistol structure onto the adapter. It will be realized that the relationship is such that the user need not employ any machining operations or otherwise change the character of the pistol grip structure 12 in order to utilize it with the adapter 72.

The adapter is locked onto the gunstock portion of the mount with the aid of bolts 84. The heads 82 of these bolts fit within recesses 80, and the shank portions extend through openings in wall 76 and thence through aligned openings formed in the previously mentioned parts 54 and 36. A nut 86 is threaded onto the shank portion of each bolt so as to lock the adapter 72, platform 58, and vertical wall 36 together in a fixed but removable relationship. FIG. 2 of the drawings shows adapter 72 as having two bolt-nut constructions for its securement onto the members 36 and 58. However, it will be appreciated that if desired one such bolt-nut assembly could be employed for this purpose.

From the above discussion it will be seen that adapter 72 provides a mounting device for the pistol structure 16, and that the peripheral flange construction on the adapter is contoured especially to fit the character of the offset portion 70 of the pistol structure. The lip construction 90 and the screw arrangement at 98 cooperate with the flange construction to provide the desired tight wriggle-free locking of the component parts.

Referring now to FIG. 4, the pistol grip structure is seen to provide a pivotal mount at 100 for the trigger 18. It will be understood that the pistol structure is of hollow configuration with a portion of the trigger 18 fitting therewithin so as to have free movement around the axis of the pivot. It will be seen that as manual pressure is applied on the trigger the upper end portion of the trigger is forced in a counterclockwise direction (FIG. 4) so as to cam the actuator lever 104 in a clockwise direction around its pivot axis 106. The actuator 104 is retained within a hollow portion of the pistol grip structure in direct vertical alignment with the trigger 18 so as to provide the desired operation. A tension spring 108 is trained within the pistol structure as shown in FIG. 4 so as to normally hold the trigger and actuator in the FIG. 4 position and to return it to the FIG. 4 position after release of manual pressure from the trigger.

Actuator 104 and trigger 18 form a conventional part of the pistol structure 16, and as the pistol structure is conventionally used the upper end portion 105 of the actuator registers with the shutter button on the camera. However, many cameras do not have a location of the shutter button such as would permit their being employed with the pistol structure in the conventional manner. It is an object of the present invention to extend the range of usefulness of the pistol structure 16, and accordingly in the illustrated embodiment there is provided a linkage structure 22 to transmit trigger movement into actuation of the camera shutter button. The illustrated linkage comprises a mounting block 110 which may be removably secured onto the platform 56 by means of the machine screws 112. These screws may conveniently extend through the previously mentioned openings 60 for performing their securing function.

Mounting block 110 is provided with a through opening which rotatably mounts the horizontal shaft 114, said shaft in turn extending through an opening in a cam disc 116 located in direct alignment with actuator 104. A set screw 118 may be provided to lock the shaft and cam disc together in adjusted positions. In this manner the cam disc is permitted to adapt to manufacturing errors in the location of lever 104 and mounting block 110. It will be understood that in operation manual depression of trigger 18 serves to move the cam disc 116 in the clockwise direction (FIG. 4).

The shaft 114 for the cam disc extends through the mounting block 110 and into two parallel arms 120 and 122. Each of the arms is provided with a set screw 124 (FIG. 2) to adjustably lock it onto the shaft. Also, each of the arms is provided with a cam surface 126 which engages a pin 128 carried by a vertically reciprocal block 130. The block is fixedly but adjustably mounted on a cylindrical stem 132 by means of a set screw 134, and a compression spring 136 is located between the lower face of block 130 and a threaded collar 138 as shown in FIG. 2. The arrangement is such that during depression of trigger 18 the arms 120 are rotated counterclockwise (FIG. 2) to force block 130 downwardly. On release of trigger 18 the spring 136 is effective to instantly drive the block 130 and stem 132 upwardly. As best shown in FIG. 1, stem 132 is provided with an arm 140 which extends above the shutter button 20 for the camera. Thus, during actuation of trigger 18 the resultant downward movement of the stem 132 is transmitted into a downward depression of the shutter button 20.

It will be noted that the mounting collar 138 for stem 132 is threaded so as to permit it to be removably mounted in any one of the threaded openings in platform 56. By this arrangement the platform may if desired be used without the illustrated linkage system, and as previously explained, the relationship of the adapter 72 and pistol structure 16 is such that these elements may also be removed from the remaining structure if desired.

It will be seen that a series of adjustments is provided between the trigger 18 and the camera shutter button 20. These adjustments permit utilization of the illustrated linkage with cameras having shutter button locations. Thus, by adjustment of set screw 134 the position of stem 132 may be changed to permit the device to operate with shutter buttons located different distances above the platform 56. In the event a particular camera has its shutter button located comparatively near its lower edge then the set screw 134 can be adjusted to downwardly adjust the stem 132. If the camera in current use has its shutter button 20 located remote from its lower limit then the set screw 134 can be suitably operated to adjust the stem 132 to an upward location.

Certain cameras have their shutter buttons located at different points laterally of their front faces, and the length of the arm 140 is accordingly made sufficient to accommodate slight differences in shutter button displacement in the lateral direction. For large variations in lateral displacement of the shutter button the set screws 124 may be utilized in combination with relocation of collar 138 to reposition the arms 120, 122 and block 130 in lateral directions. Thus, the collar 138 may be threaded into a different one of the openings in the platform 56 and the set screws 124 may be suitably actuated to reposition the arms 122 and 120 at new locations on the shaft 114. In this connection it is contemplated that mounting block 110 can be reversed with respect to the arms 120 and 122 to provide the desired adjustment. Thus, the mounting block 110 can, if desired, be interchanged with the arms 120 and 122, i.e., referring to FIG. 3 the mounting block can occupy the positions now occupied generally by the arms 120 and 122, and the arms can be located in the position now generally occupied by the block 110.

It will be understood that if desired the illustrated assembly of linkage 22, adapter 72, and pistol-trigger structure 16 can be removed, as for example in those cases when the user desires to operate the camera by direct finger pressure on the shutter button 20. Similarly, in those instances when the user has no need of the pistol-type structure the device can be supplied from the manufacturer without the pistol and linkage arrangement. Additionally, the arrangement is such that the user can add the pistol-linkage structure after his original purchase of the gun-type mount. It will thus be seen that by the provision of the adapter and linkage, the pistol structure and gun-type mount are enabled to be operatively incorporated together so as to handle a wide range of camera styles and sizes.

The FIG. 1 embodiment is designed particularly for those cameras which have the shutter button located on the camera front or top face. The construction shown in FIGS. 7 through 10 is designed particularly for those arrangements wherein the camera has its shutter button located on its side face. Referring to FIG. 7, it will be seen that the pistol grip structure 16 has been reversed relative to the front-to-rear dimension of the gunstock mount, i.e., the trigger of the pistol faces the rear instead of the front. The mechanics of making the change in pistol grip location involve merely reversing or interchanging the positions of the arms 24 and 28. The FIG. 7 arrangement is intended to accommodate the wishes of those users who desire to actuate the camera by a push action on the trigger as distinguished from a pulling action thereon.

In the FIG. 7 arrangement there is provided an auxiliary camera platform 150 having a vertical leg 152 for permitting it to be locked between adapter 72 and plate 54 as shown in FIG. 9. The purpose of platform 150 is to elevate the supported camera sufficiently above the actuator lever 104 for convenient shutter button operation. The platform is preferably elongated in the horizontal direction to provide support for elongated camera housings, and one or more screws 154 may be utilized to provide additional support for the platform. In suitable constructions platform 150 may be utilized without platform 56 or screws 154 if desired.

As will be noted from FIG. 7, the trigger for the pistol structure is arranged to act through a linkage lever 160 and thence onto the shutter button 162, said shutter button having a pivotal mount at 164 and being depressible in a clockwise direction to operate the shutter. The lever 160 is preferably formed from a flat steel strip and is provided at its lower end with a cylindrical head 168 which forms a cooperating surface engageable with the upper end portion of the lever 104.

Lever 160 is fulcrumed on a conventional film rewind spindle 170 which extends from within the camera housing 172 to operatively connect with the film rewind crank 174. Conventionally the crank is provided with a knob 176 and is formed in two hinged-together sections which permit the main portion of the crank to be folded flat against the side of the camera housing so as to place the knob 176 within a recess at 178 at those times when it is not desired to operate the rewind apparatus.

The mounting of lever 160 on the spindle 170 does not interfere with operation of the crank 174, and the crank may be operated in the usual manner without disconnecting the lever 160. The upper end of the lever is provided with an outwardly directed flange or abutment structure 180 which engages against the end of the shutter button 162, the arrangement being such that during counter-clockwise movement of lever 160 around the axis of spindle 170 the actuator button 162 is depressed for operation of the camera.

It will be seen that the construction in FIG. 7 is of particular advantage in accommodating cameras of the type having the shutter button arranged on the camera housing side face. As in the structure of FIG. 1, the FIG. 7 construction is comprised of a series of detachably connected devices so arranged as to permit the pistol structure to be used or not as desired. Also, the arrangement is such that the camera is accommodated to the pistol structure and gunstock mount without need for any machining operations on the camera, gunstock or pistol structure.

If desired the structure of FIG. 1 may be utilized to mount with auxiliary mounting structures so as to provide a camera bank. Such an arrangement is shown in FIG. 11 wherein one of the threaded openings in platform 56 is utilized in combination with a screw 204 to mount the auxiliary camera platform 56a. Similarly the conventional threaded opening 202 (FIG. 6) in the pistol grip structure may be utilized in combination with a screw 200 to mount the auxiliary camera platform 56b.

The illustrated camera bank mount structure can be obtained at relatively small cost, and the auxiliary platforms can be removed quickly when not needed.

All of the illustrated constructions are susceptible to relatively low cost manufacture, and may be built to have interchangeable application as left or right hand devices, thereby adapting the various devices to use by persons left-handed and right-handed. The FIG. 7 mechanism may be accommodated to cameras having different shutter button locations by utilizing a differently configured bell crank 160 to accord with different rewind spindle-shutter button spacings. Each lever 160 is a very low cost item, and different cameras can be accommodated at slight expense.

The embodiments of the invention illustrated have been described with particularity in reference to structures employed therein, but it will be appreciated that some variation in construction and arrangement of parts may be resorted to without departing from the spirit of the invention, and in this connection reference should be made to the appended claim for ascertainment of the limits of the patent monopoly.

I claim:

In a portable hand-shoulder mount for a camera,
a central gunstock having front and rear ends,
a telescoping tubular hand support arm pivotally connected at one end to the front end of said gunstock,
said hand support arm including a hand grip carried intermediate the ends thereof,
means for positively locking said hand support arm in an adjusted position,
a telescoping tubular shoulder support arm pivotally connected at one end to the rear end of said gunstock,
means for positively locking said shoulder support arm in an adjusted position,
said shoulder support including a shoulder rest adjustably pivotally secured to its free end,
a camera platform carried by said gunstock,
a pistol grip having a trigger and carried by said gunstock,
operating means including a cam mounted on said platform and engageable with the actuator of a camera mounted on said platform,
and means connecting said trigger and said operating means,
whereby movement of said trigger causes actuation of the camera.

References Cited in the file of this patent

UNITED STATES PATENTS

| 2,483,711 | Roos | Oct. 4, 1949 |
| 2,617,142 | Cadwell | Nov. 11, 1952 |
| 2,935,006 | Everetts | May 3, 1960 |

FOREIGN PATENTS

| 666,808 | Great Britain | Feb. 20, 1952 |